United States Patent
Kodama

(10) Patent No.: US 7,032,070 B2
(45) Date of Patent: Apr. 18, 2006

(54) METHOD FOR PARTIAL DATA REALLOCATION IN A STORAGE SYSTEM

(75) Inventor: Shoji Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/665,893

(22) Filed: Sep. 19, 2003

(65) Prior Publication Data

US 2004/0064641 A1    Apr. 1, 2004

Related U.S. Application Data

(63) Continuation of application No. 09/905,270, filed on Jul. 13, 2001, now Pat. No. 6,647,460.

(51) Int. Cl.
*G06F 12/00* (2006.01)
(52) U.S. Cl. .............................. 711/114; 711/6; 711/165
(58) Field of Classification Search ................ 711/114, 711/165, 6; 714/6
See application file for complete search history.

(56) References Cited

U.S. PATENT DOCUMENTS

| 5,432,922 | A | | 7/1995 | Polyzois et al. |
| 5,615,364 | A | | 3/1997 | Marks |
| 5,809,516 | A | | 9/1998 | Ukai et al. |
| 5,812,753 | A | | 9/1998 | Chiariotti |
| 5,832,198 | A | * | 11/1998 | Lucht ............................ 714/6 |
| 6,101,497 | A | | 8/2000 | Ofek |
| 6,532,548 | B1 | | 3/2003 | Hughes |
| 6,728,832 | B1 | * | 4/2004 | Yamamoto et al. ......... 711/114 |

* cited by examiner

*Primary Examiner*—Mano Padmanabhan
*Assistant Examiner*—Mehdi Namazi
(74) *Attorney, Agent, or Firm*—Townsend and Townsend and Crew LLP

(57) ABSTRACT

A method of reallocating data among physical disks corresponding to a logical disk is provided. A logical disk is partitioned into a plurality of groups, each group comprising at least one segment on at least one of a first plurality of physical disks corresponding to the logical disk. One group of the plurality of groups is partitioned into a plurality of sub-groups, and, for each sub-group of the plurality of sub-groups but one, the sub-group is copied to at least one segment on at least one of a second plurality of physical disks corresponding to the logical disk.

15 Claims, 17 Drawing Sheets

PARITY GROUP TABLE

| PARITY GROUP NAME | PG01 |
|---|---|
| RAID LEVEL | 5 |
| TOP ADDRESS | 100 |
| BOTTOM ADDRESS | 300 |
| PHYSICAL DISK LIST | PD01 |
| | PD02 |
| | PD03 |
| | PD04 |
| STATUS | STABLE |

320

| LOGICAL DISK NAME | LD01 |
|---|---|
| PARITY GROUP LIST | PG01-1 |
| | PG01-2 |
| | PG02 |
| | PG03 |

490

| PARITY GROUP NAME | # OF I/O'S |
|---|---|
| PG01 | 65536 |
| PG02 | 20 |
| PG03 | 4 |

| PG NAME | BIT MAP | | | | | | | | |
|---|---|---|---|---|---|---|---|---|---|
| PG01-2 | BLOCK # | 1 | 2 | 3 | 4 | 5 | 6 | 7 | 8 |
| | COPIED ? | Y | N | N | N | Y | Y | N | Y |

*FIG. 11*

METHOD FOR PARTIAL DATA REALLOCATION IN A STORAGE SYSTEM

CROSS-REFERENCE TO RELATED APPLICATION

This application is a continuation of application Ser. No. 09/905,270 filed Jul. 13, 2001 entitled "Storage Device with I/O Counter for Partial Data Reallocation," now U.S. Pat. No. 6,647,460.

BACKGROUND OF THE INVENTION

The present invention relates generally to storage systems, and more specifically to storage systems having more than one physical disk configured as one logical disk.

Redundant Array of Independent Disks (RAID) is a well-known technology that permits increased availability of data and also increased input/output (I/O) performance. In RAID storage systems, several physical disk drives are configured as one logical disk drive, and I/O requests to the logical disk drive are distributed within the storage system to the physical disk drives and processed in parallel. RAID technology provides many benefits. For example, a RAID storage system can accommodate very large file systems. Thus, large files and many files can be stored in one file system, as opposed to dividing them into several smaller file systems. Additionally, RAID technology can provide increased I/O performance because data on different physical disks can be accessed in parallel. Moreover, RAID technology can provide increased reliability and fault tolerance. For example, data on one of the physical disks (or information that can be used to reconstruct the data) can be stored on one or more of the other physical disks. Thus, if one of the physical disks of a RAID storage system fails, the data on the failed disk can be retrieved from (or reconstructed from information on) one or more of the other physical disks.

But this technology has a restriction that once physical disk drives are configured as a logical disk drive with some number of physical disk drives, it is difficult to increase the number of the physical disk drives to, for example, increase storage capacity of the logical disk or to increase parallelism of I/O processing.

For example, consider the RAID level 0 (RAID0) data allocation technique in which data is striped among the physical disk drives. With a logical disk comprising four physical disks A, B, C, and D, and with a stripe size of one megabyte, physical disk A would store the 1st, 5th, 9th, etc., megabytes of data. Physical disk B would store the 2nd, 6th, 10th, etc., megabytes of data. Physical disk C would store the 3rd, 7th, 11th, etc., megabytes of data. And, physical disk D would store the 4th, 8th, 12th, etc., megabytes of data. If it is desired to add a fifth physical disk E, then data on physical disks A, B, C, and D must be reallocated. For example, the 5th megabyte of data would need to be copied from physical disk A to physical disk E, the 6th megabyte of data copied from physical disk B to physical disk A, and so on. Thus, when adding a physical disk to the logical disk configuration, large amounts of data must be moved among the physical disk drives. Such data movement takes a long time and consumes processing power of the storage system, decreasing the I/O performance of the storage system.

Additionally, current storage systems do not utilize disk capacity efficiently. For example, with the RAID level 1 (RAID1) technique, data on one physical disk drive is mirrored on another physical disk drive. When an I/O request to read data from the logical disk drive is issued, the requested data can be read from either of the physical disk drives. In order to balance the I/O load of the storage system, the physical disk drive processing the lower number of I/O requests responds to the request. I/O performance of the storage system increases in proportion to the number of physical disk drives. But making multiple copies of all the data doesn't use disk capacity efficiently. For instance, data that is rarely accessed is copied among a plurality of physical disks along with frequently accessed data. The copying of rarely accessed data increases I/O performance only slightly, while consuming disk capacity.

BRIEF SUMMARY OF THE INVENTION

In one embodiment according the present invention, a method of reallocating data among physical disks corresponding to a logical disk is provided. The method comprises partitioning a logical disk into a plurality of groups, each group comprising at least one segment on at least one of a first plurality of physical disks corresponding to the logical disk. The method also comprises partitioning one group of the plurality of groups into a plurality of sub-groups, and, for each sub-group of the plurality of sub-groups but one, copying the sub-group to at least one segment on at least one of a second plurality of physical disks corresponding to the logical disk.

In another embodiment, a storage device is provided. The storage device includes a first plurality of physical disks corresponding to a logical disk, wherein the logical disk is partitioned into a plurality of groups, each group comprising at least one segment on at least one of the first plurality of physical disks, and at least a second physical disk corresponding to the logical disk. Additionally, the storage device includes a processor, coupled with the first plurality of physical disks and with the at least a second physical disk. The processor is configured to partition one group of the plurality of groups into a plurality of sub-groups, and, for each sub-group of the plurality of sub-groups but one, copy the sub-group to at least one segment on the at least a second physical disk. The storage device further includes a disk controller, coupled with a first memory, with the first plurality of physical disks and with the at least a second physical disk, and coupled to receive I/O requests for the logical disk from at least one host computer. The disk controller is configured to determine one or more of the physical disks of the first plurality of physical disks and the at least a second physical disk to which an I/O request corresponds, and perform the requested I/O to the determined one or more of the physical disks.

In yet another embodiment, a method of reallocating data among physical disks corresponding to a logical disk is provided. The method comprises partitioning a logical disk into a plurality of groups, wherein each group comprises a plurality of segments on at least one of a first plurality of physical disks corresponding to the logical disk. The method also comprises determining a most frequently accessed group of the plurality of groups, and partitioning the most frequently accessed group into a plurality of sub-groups, including partitioning each segment of the plurality of segments comprising the most frequently accessed group into a plurality of sub-segments, wherein each sub-group comprises at least one sub-segment. Additionally, the method comprises, for each sub-group of the plurality of sub-groups but one, allocating at least one segment on at least one of a second plurality of physical disks corresponding to the logical disk, each segment on the second plurality of disks corresponding to the at least one sub-segment comprising the sub-group. The method further comprises, for each sub-group of the plurality of sub-groups but the one, copying the corresponding at least one sub-segment to the corresponding at least one segment on the at least one of the second plurality of physical disks.

In still another embodiment, a storage device is provided. The storage device includes a first plurality of physical disks corresponding to a logical disk, wherein the logical disk is partitioned into a plurality of groups, each group comprising at least one segment on at least one of the first plurality of physical disks, and at least a second physical disk corresponding to the logical disk. The storage device additionally includes a processor, coupled with the first plurality of physical disks and with the at least a second physical disk. The processor is configured to partition one group of the plurality of groups into a plurality of sub-groups, and, for each sub-group of the plurality of sub-groups but one, copy the sub-group to at least one segment on the at least a second physical disk.

Numerous advantages or benefits are achieved by way of the present invention over conventional techniques. In a specific embodiment, the present invention provides improved I/O efficiency without sacrificing disk capacity. Also, in some embodiments, data in a storage system can be reconfigured among a greater number of physical disks without decreasing I/O performance during the reconfiguration. One or more of these advantages may be present depending upon the embodiment.

These and other features and advantages of the present invention will be better understood with reference to the detailed description below and the accompanying diagrams.

BRIEF DESCRIPTION OF THE DRAWINGS

FIG. 10 is an example of a data structure that includes numbers of input/output (I/O) accesses to parity groups according to one embodiment of the present invention;

FIG. 11 is an example of a data structure that indicates whether various blocks of a parity group have been copied according to one embodiment of the present invention;

DESCRIPTION OF THE SPECIFIC EMBODIMENTS

Overview

Figure 1:
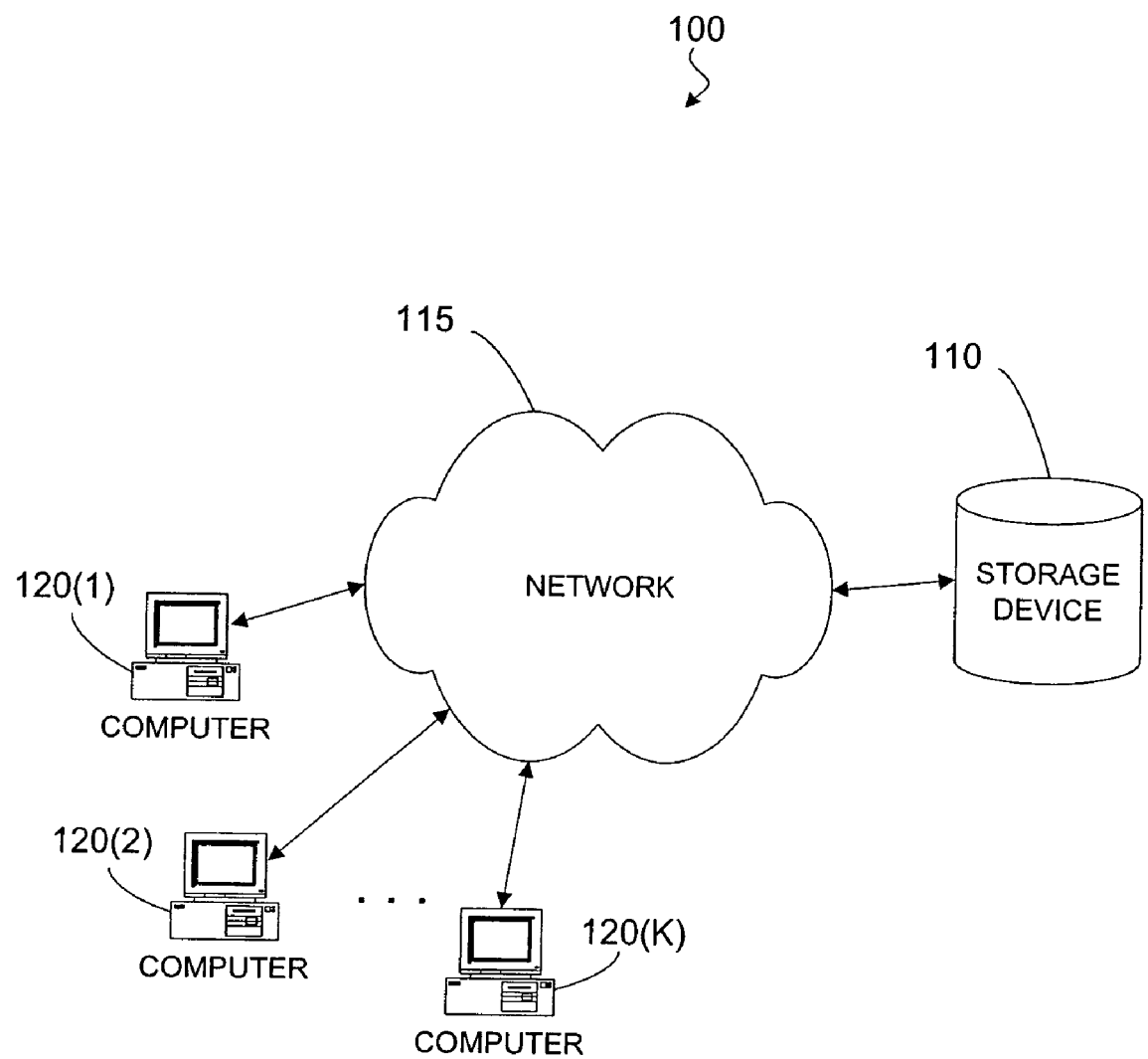
FIG. 1 is a simplified block diagram illustrating an example of a system in which the present invention may be embodied.

FIG. 1 is a simplified block diagram illustrating an example of a system in which the present invention may be embodied. The system 100 includes a storage device 110, coupled with a network 115. Additionally, one or more computers 120 are also coupled with the network 110. Computers 120 can access data stored on the storage system 110 via the network 115. In another embodiment, one or more computers 120 may be coupled with the storage device 110 directly instead of via a network.

Figure 2:
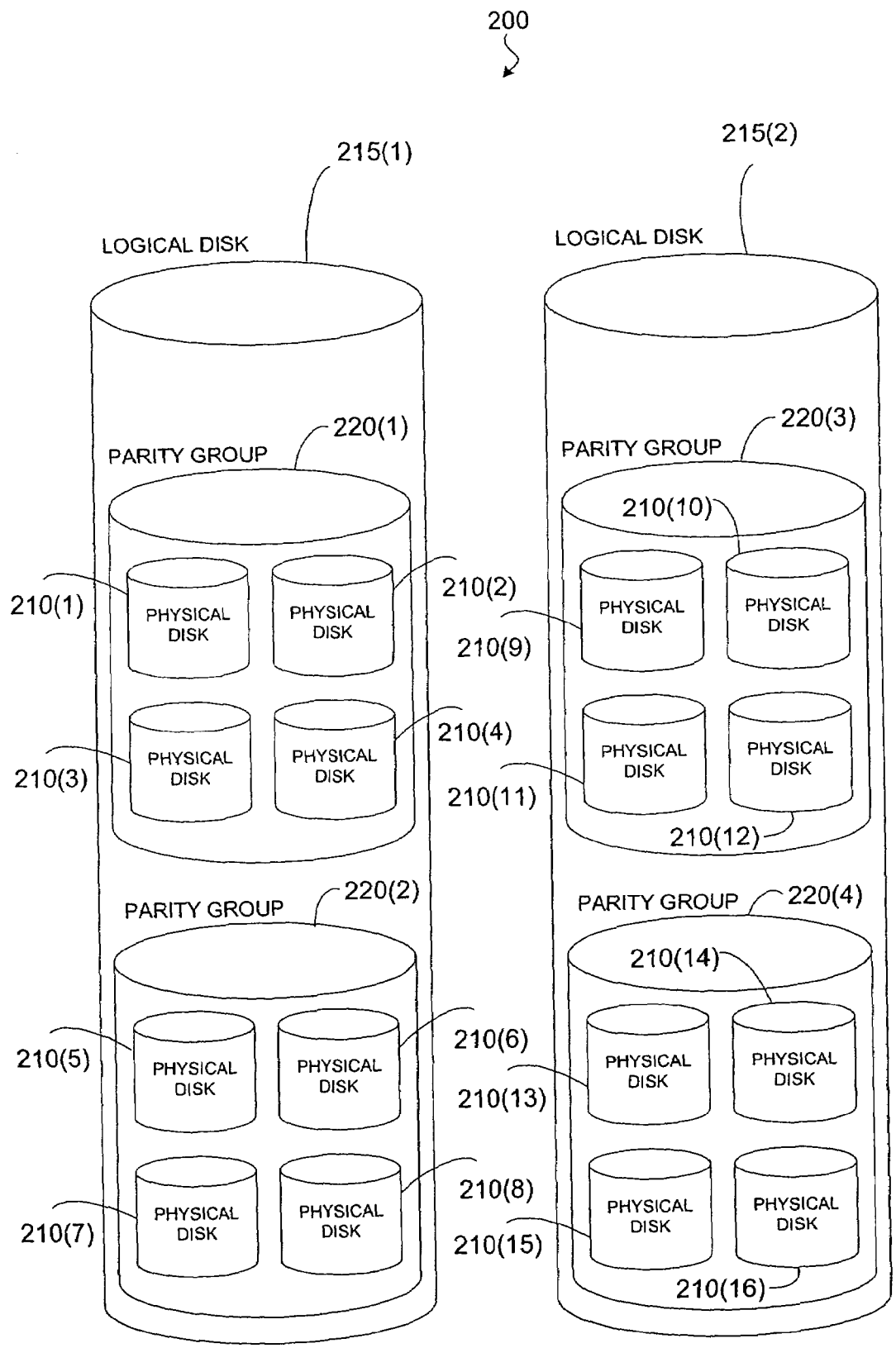
FIG. 2 is a simplified block diagram of a storage system according to one embodiment of the present invention.

FIG. 2 is a simplified block diagram illustrating one embodiment of a storage system 200 according to the present invention. Particularly, FIG. 2 is a logical representation of a storage system 200 comprising a plurality of physical disk drives 210. The plurality of physical disks 210 are configured as one or more logical disks 215, and each logical disk 215 may comprise storage segments on one or more of the physical disks 210. But, as is well known to those skilled in the art, computers accessing the storage system 200 "see" the logical disk 210 as one disk, regardless of how many physical disks 210 actually comprise the logical disk 215.

In embodiments according to the present invention, a logical disk is partitioned into a plurality of groups 220 hereinafter referred to as "parity groups." Each parity group 220 may comprise storage segments on one or more physical disks 210 corresponding to the logical disk 215. Data in each parity group 220 may be allocated according to any number of data allocation techniques, including, but not limited to, RAID0, RAID1, RAID2, RAID3, RAID4, RAID5, RAID10, etc. Additionally, data in a parity group 220 may be allocated independently of other parity groups. For example, one parity group 220(1) may be allocated according to RAID0 while another parity group 220(2) is allocated according to RAID5. In some embodiments, logical disk 215 has a first address space, parity groups 220 comprising the logical disk have a second address space, and physical disks 210 have a third address space. In these embodiments, I/O requests to the storage system 200, (for example, from a computer 120 in FIG. 1) are addressed in the first address space. Then, the storage system 200 determines to which physical disk(s) and which address(es) in the third address space the address(es) in the first address space corresponds. Such address conversions can be accomplished by any number of techniques known to those skilled in the art.

Figure 3A:
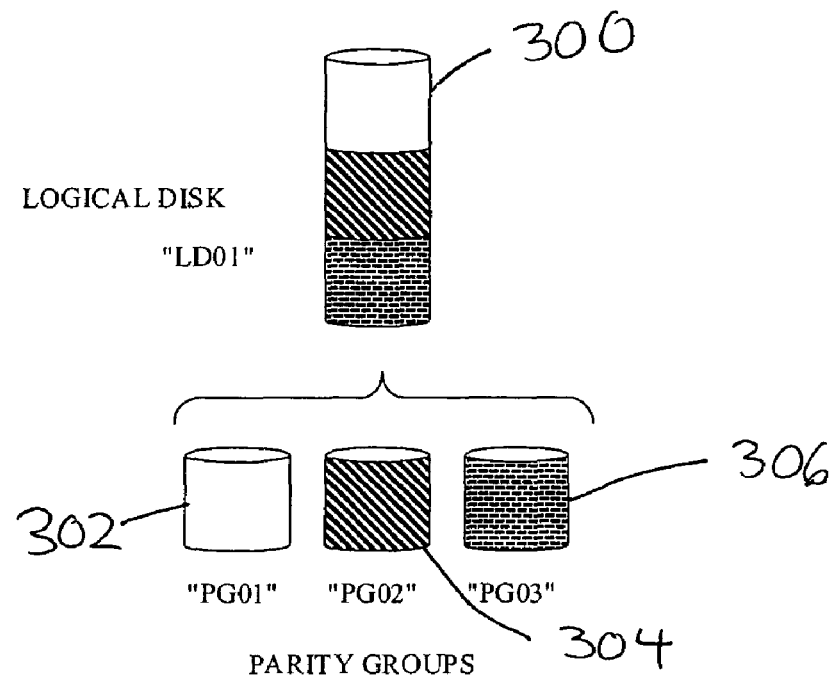
FIG. 3A is a simplified block diagram illustrating an example of a configuration of a logical disk according to one embodiment of the present invention.
Figure 3B:
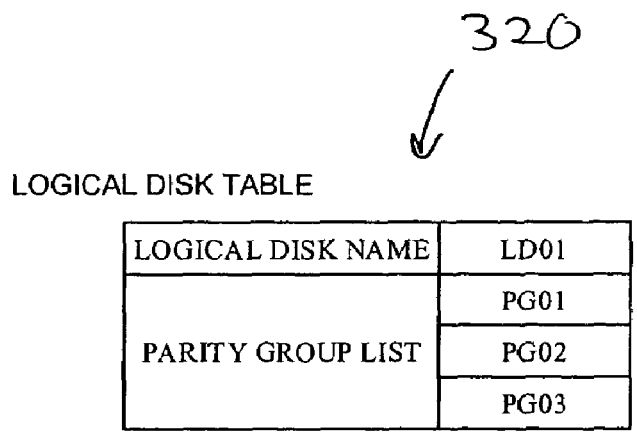
FIG. 3B is an example of a data structure that describes a configuration of a logical disk according to one embodiment of the present invention.

FIG. 3A is a simplified block diagram illustrating an example of a configuration of a logical disk 300 according to one embodiment according to the present invention. Logical disk 300 is partitioned into a plurality of parity groups 302, 304, and 306. FIG. 3B is an example of a data structure 320 that describes the configuration illustrated in FIG. 3A. The data structure 320 is a table that includes the name of the logical disk, as well as a list of the names of parity groups that comprise the logical disk.

Figures 4A, 4B:
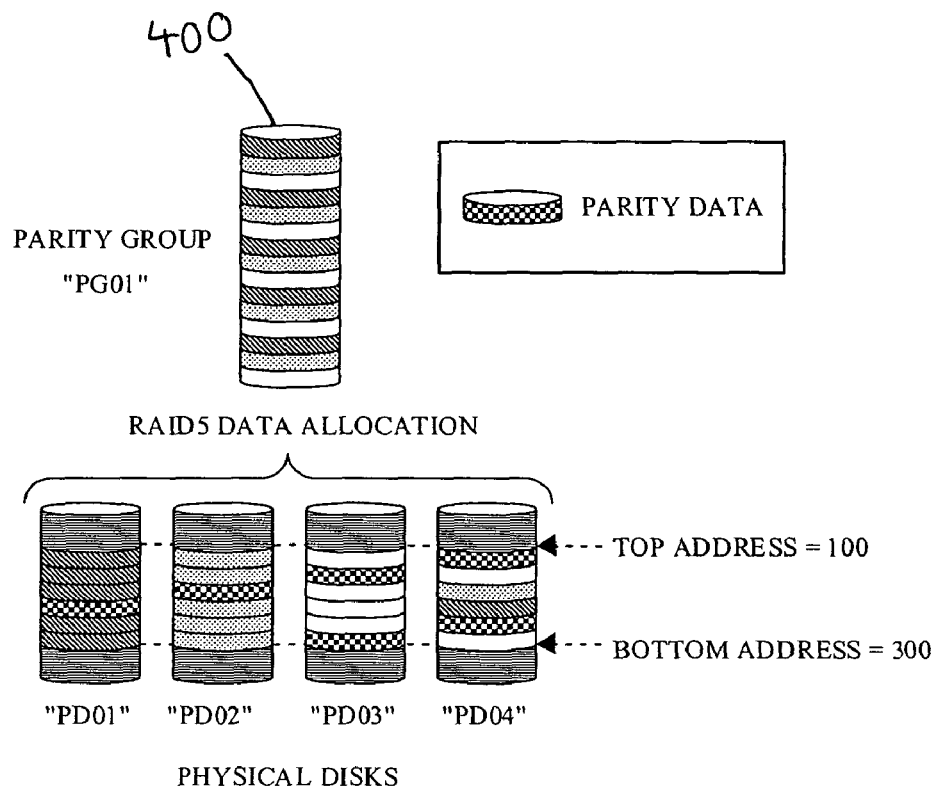
FIG. 4A is a simplified block diagram illustrating an example of a parity group according to one embodiment of the present invention.
FIG. 4B is an example of a data structure that describes a configuration of a parity group according to one embodiment of the present invention.

As described above, each parity group may comprise storage segments on one or more physical disks, and data in each parity group may be allocated according to any number of data allocation techniques. Thus, although the term "parity" is used, a parity group need not include any parity information. For example, a parity group may be configured according to RAID0 which does not provide for parity information for data recovery. FIGS. 4A and 4B illustrate an example of a parity group in one embodiment according to the invention. FIG. 4A illustrates a parity group 400 comprising storage segments on four physical disks. Particularly, the parity group comprises data segments between a top address and a bottom address on each of the physical disks. Additionally, data comprising the parity group 400 is allocated to the four physical disks according to the RAID5 data allocation method.

FIG. 4B is an example of a data structure 420 that describes the configuration illustrated in FIG. 4A. The data structure 420 is a table including the name 422 of the parity group as well as information describing the configuration of the parity group. For example, the table 420 includes an indication 424 of the data allocation method for the parity group, as well as a list 426 of the names of physical disks that include storage segments corresponding to the parity group. Additionally, the table 420 includes an indication 428 of which data segments on the physical disks correspond to the parity group. The indication 428 can be, as in FIG. 4B, for example, a top address and bottom address. Thus, table 420 indicates that, on each of physical disks PD01, PD02, PD03 and PD04, the storage segments between address 100 and address 300 are allocated for parity group PG01. Further, the table 420 includes an indication 430 of status of the parity group. Status of parity groups will be described subsequently.

It is to be understood that FIGS. 4A and 4B are merely an example of a method of allocating storage for a parity group among a plurality of physical disks. One skilled in the art will recognize many alternatives, modifications, and equivalents. For example, storage for the parity group need not be at the same location on each physical disk. Additionally, the amount of allocated storage on each physical disk need not be the same.

Figure 5:
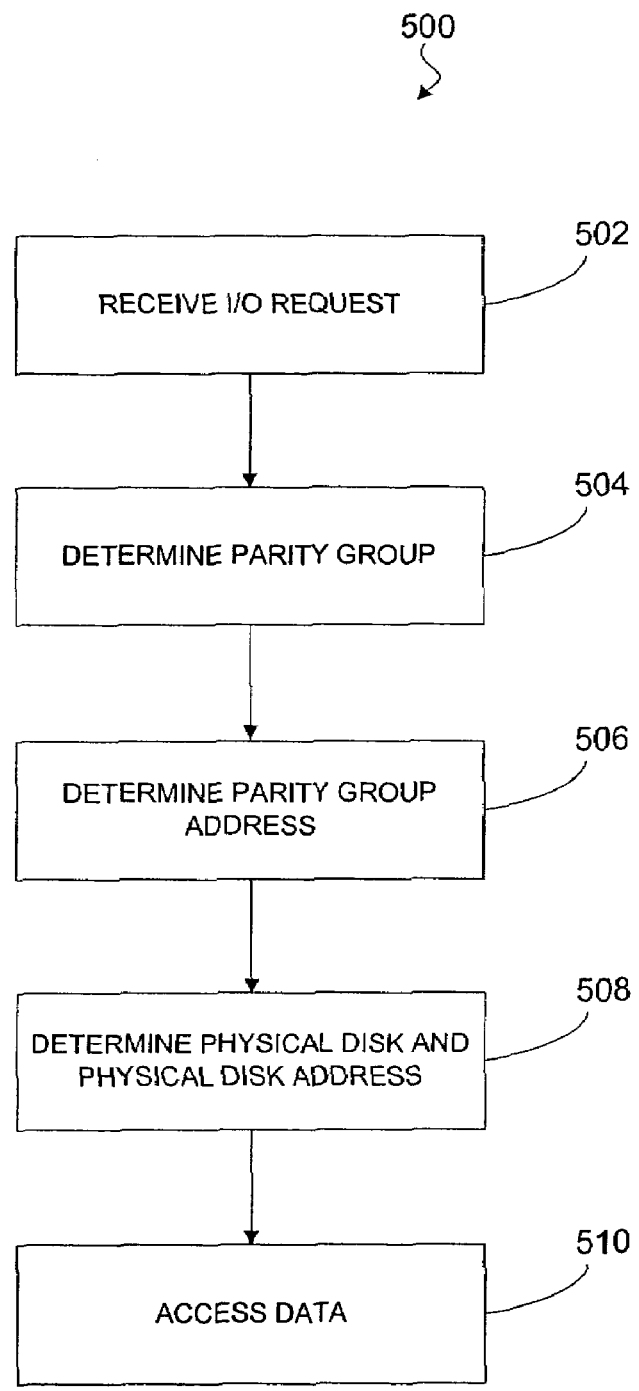
FIG. 5 is a simplified flow diagram illustrating a method of processing I/O requests to a logical disk according to one embodiment of the present invention.

FIG. 5 is a simplified flow diagram illustrating a method of processing I/O requests to a logical disk configured as described above. In a step 502, an I/O request to the logical disk is received, the request including an indication of the address of the requested data within the logical disk. Then, in a step 504, it is determined to which parity group the requested data belongs. For example, a data structure such as that illustrated in FIG. 3B is examined, along with the address of the requested data within the logical disk, to determine the parity group in which requested data belongs. Next, in a step 506, an address of the requested data within the parity group is determined. In a step 508, the physical disk on which the requested data is located, and the address within the physical disk of the requested data is calculated. For example, a data structure such as that illustrated in FIG. 4B is examined, along with the address of the requested data within the parity group, to determine the physical disk and the address on the physical disk corresponding to the requested data. Finally, in a step 510, the requested data is accessed.

Partitioning Parity Groups

In embodiments according to the present invention, a parity group is partitioned into two or more new parity groups, and at least one of the new parity groups is copied to physical disks different than those on which the original parity group was located. Thus, the original parity group is, in effect, spread among a larger number of physical disks. Therefore, I/O performance is increased because more I/O requests corresponding to the original parity group can be processed in parallel. Additionally, as will be described below, the storage system can continue to respond to I/O requests while the partitioning and copying of a parity group is performed. Therefore, partitioning and copying of parity groups is transparent to computers accessing the storage device.

Figure 6:
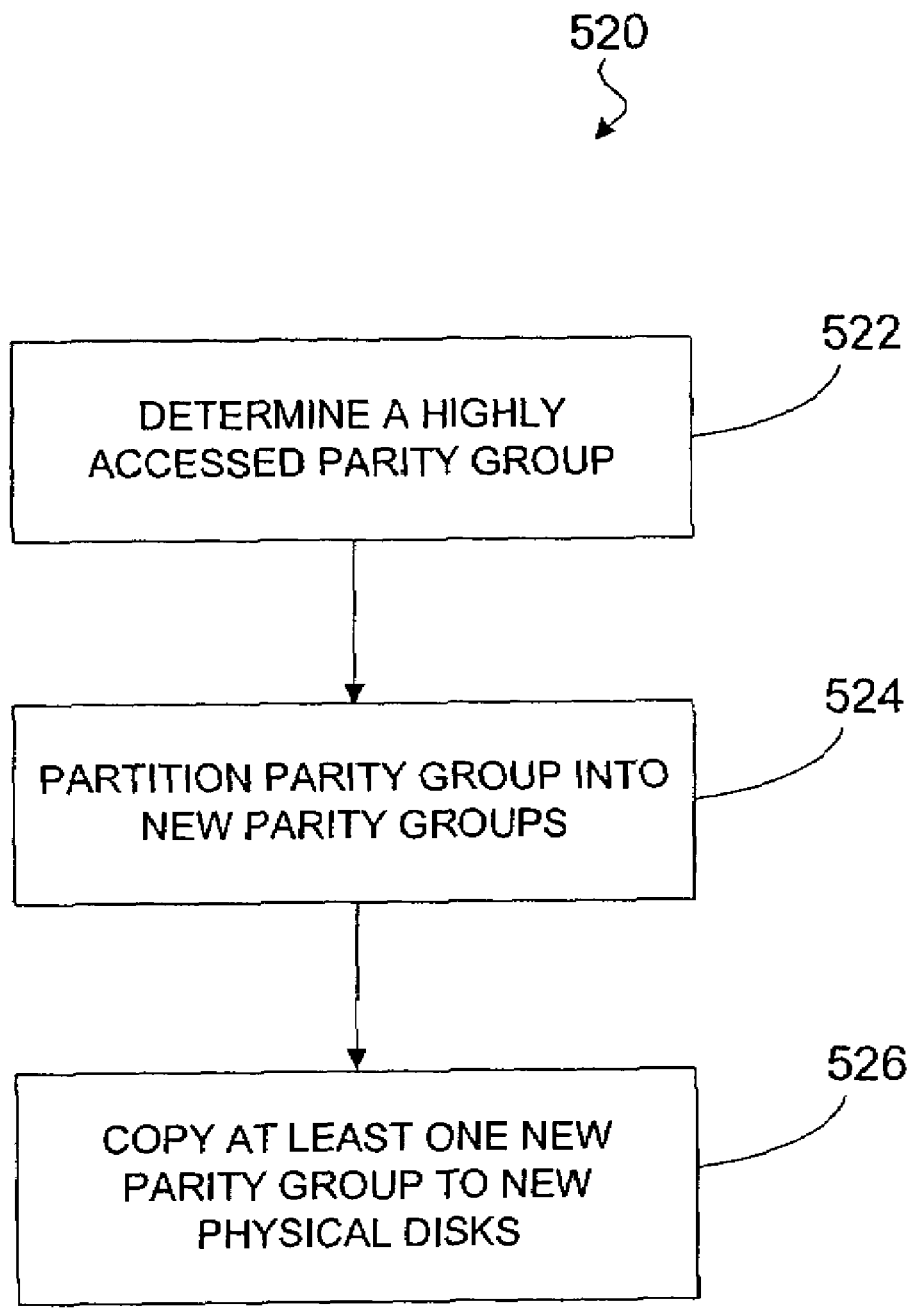
FIG. 6 is a simplified flow diagram illustrating a method of partitioning parity groups according to one embodiment of the present invention.

FIG. 6 is a simplified flow diagram illustrating one embodiment of a method according to the present invention. First, in a step 522, a highly accessed parity group is determined. In some embodiments, for example, access to the parity groups is examined to determine whether one or more parity groups are accessed with inordinate frequency. Determining whether a parity group is highly accessed is described in more detail below. Next, in a step 524, the parity group determined in step 522 is partitioned into two or more new parity groups. Finally, in a step 526, at least one of the new parity groups is copied to one or more physical disks that are different than the physical disks on which the previous parity group is stored. In certain embodiments of the present invention, the flow of FIG. 6 is implemented in parallel with, and without interfering with, I/O requests.

Figures 7A, 7B:
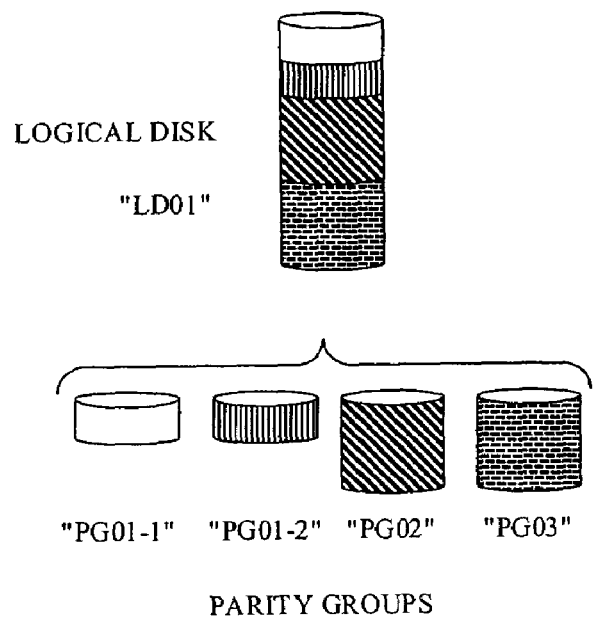
FIG. 7A is a simplified block diagram illustrating an example of a configuration of a logical disk according to one embodiment of the present invention.
FIG. 7B is an example of a data structure that describes a configuration of a logical disk according to one embodiment of the present invention.

FIG. 7A is a simplified block diagram illustrating an example of partitioning of a parity group corresponding to a logical disk. Particularly, FIG. 7A illustrates the logical disk 300 of FIG. 3A. However, in FIG. 7A, the parity group PG01 has been partitioned into two new parity groups PG01-1 and PG01-2. FIG. 7B is an example of a data structure 320 that describes the configuration illustrated in FIG. 7A. FIG. 7B illustrates the table 320 of FIG. 3B, modified to reflect the partitioning of the parity group PG01. Particularly, table 320 has been modified so that the list of parity groups includes the names PG01-1 and PG01-2 in replace of the name PG01.

Figure 8A:
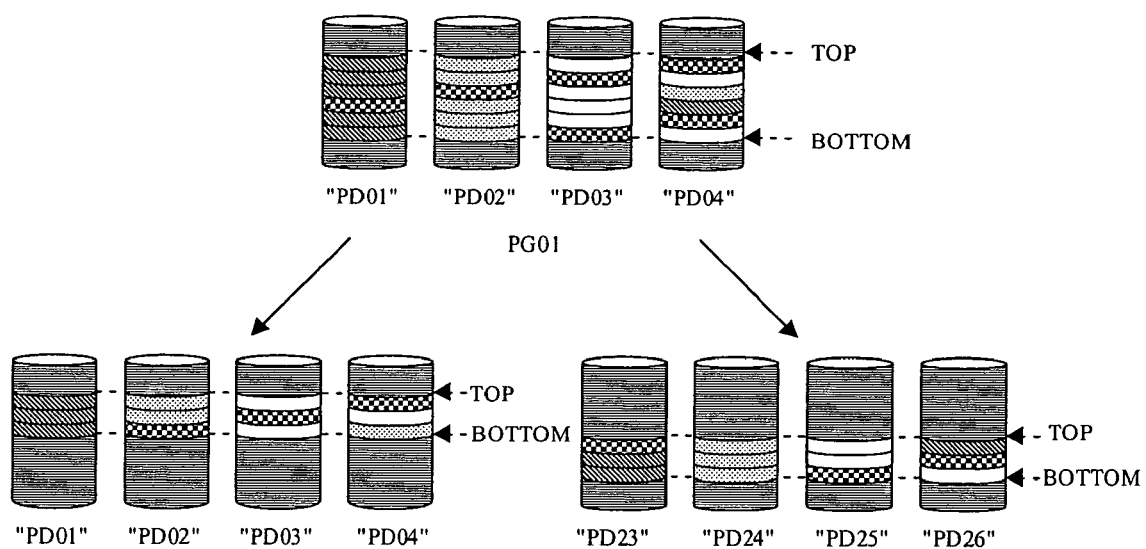
FIG. 8A is a simplified block diagram illustrating partitioning of a parity group according to one embodiment of the present invention.
Figure 8B:
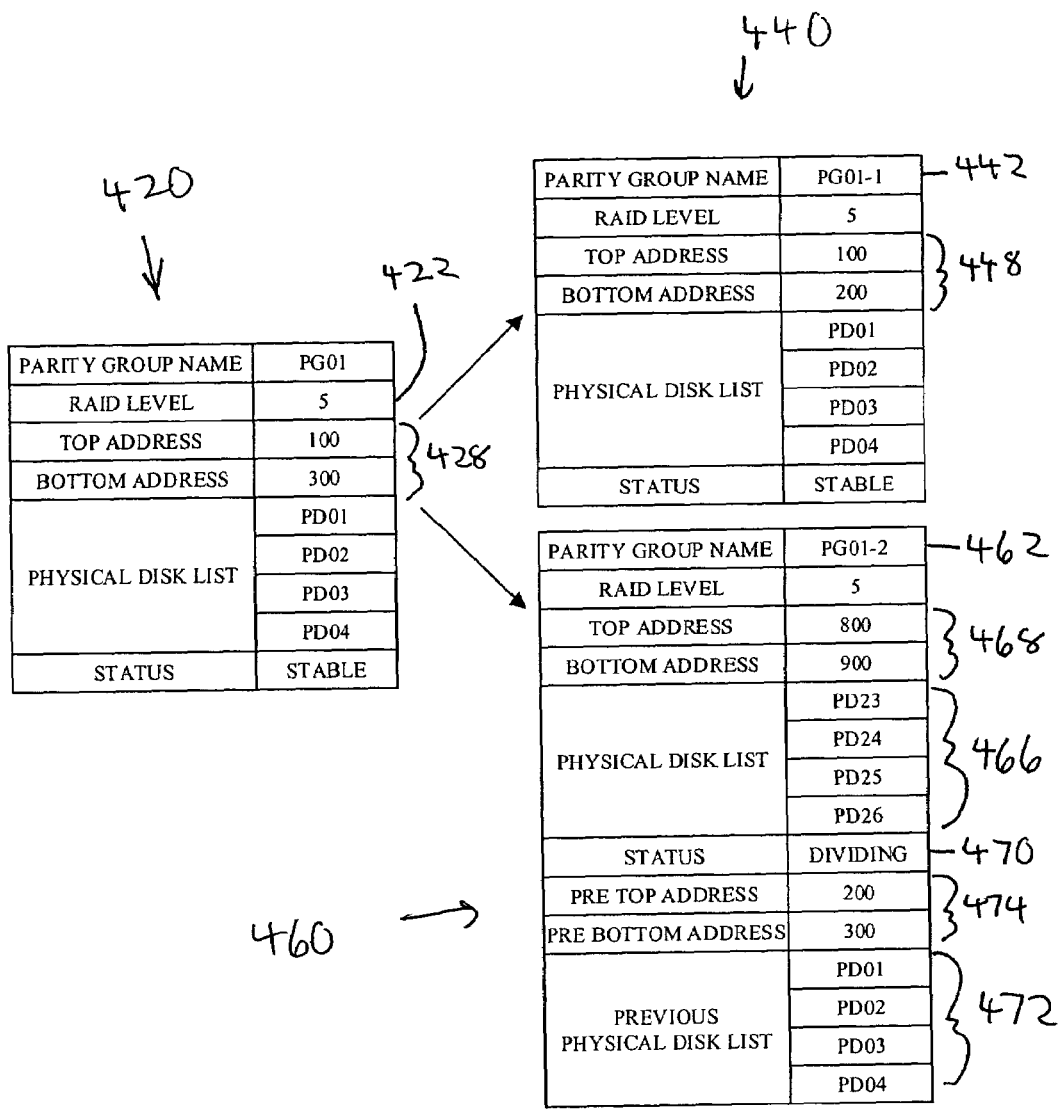
FIG. 8B is an example of a data structure that describes configuration of a partitioned parity group according to one embodiment of the present invention.

FIGS. 8A and 8B illustrate an example of partitioning a parity group into new parity groups, and copying the new parity groups to a different set of physical disks. Particularly, FIG. 8A illustrates partitioning the parity group PG01 illustrated in FIG. 4A into two new parity groups, PG01-1 and PG01-2. As described above, the parity group PG01 of FIG. 4A comprises storage segments on four physical disks PD01, PD02, PD03 and PD04, according to a RAID5 data allocation. As illustrated in FIG. 8A, the storage segments corresponding to the parity group PG01 are partitioned in two, and one half of the parity group is copied from physical disks PD01, PD02, PD03 and PD04 to different physical disks PD23, PD24, PD25 and PD26. In this particular example, data on each of the physical disks PD01, PD02, PD03 and PD04 between the addresses 200 and 300 are copied to physical disks PD23, PD24, PD25 and PD26 at storage locations between the addresses 800 and 900. After copying is completed, the storage segments of physical disks PD01, PD02, PD03, and PD04 corresponding to the copied data may be deallocated so that the storage segments can be reused.

FIG. 8B is an example of data structures 440 and 460 that describe the configuration illustrated in FIG. 8A. Table 420 is the table of FIG. 4B and describes the configuration of the parity group PG01 prior to its partitioning. Tables 440 and 460 describe the configuration of the new parity groups PG01-1 and PG01-2, respectively. Table 440 is similar to table 420. However, the Parity Group Name field 442 in table 440 indicates PG01-1. Additionally, the indication 448 of the storage segments corresponding to the parity group PG01-1 in table 440 is different than that in table 420. Particularly, the Bottom Address field is different, reflecting that the data the parity group PG01-1 only includes the storage segments between the addresses 100 and 200, whereas the parity group PG01 included storage segments between the addresses 100 and 300.

Table 460 is similar to tables 420 and 440 but includes additional information. For example, as with tables 420 and 440, table 460 includes an indication 462 of the name of the parity group, and indication 464 of the data allocation method, a list 466 including the name of physical disks on which the parity group is stored, an indication 468 of the particular data segments on those physical disks allocated for the parity group, and a status field 470. In table 460, the status field 470 indicates that the parity group PG01-2 is currently being copied from other physicals disks to the physicals disks indicated in the list 466.

Table 460 includes additional information not included in tables 420 and 440. For example, table 460 includes a list 472 that includes the names of physical disks on which data corresponding to the parity group was stored previously, prior to partitioning. Additionally, table 460 includes an indication 474 of the particular segments of the physical disks on which the parity group was previously stored. Thus, in the example illustrated in FIG. 8B, the data corresponding to parity group PG01-2 was previously stored on physical disks PD01, PD02, PD03 and PD04 between the addresses 200 and 300.

Figure 9:
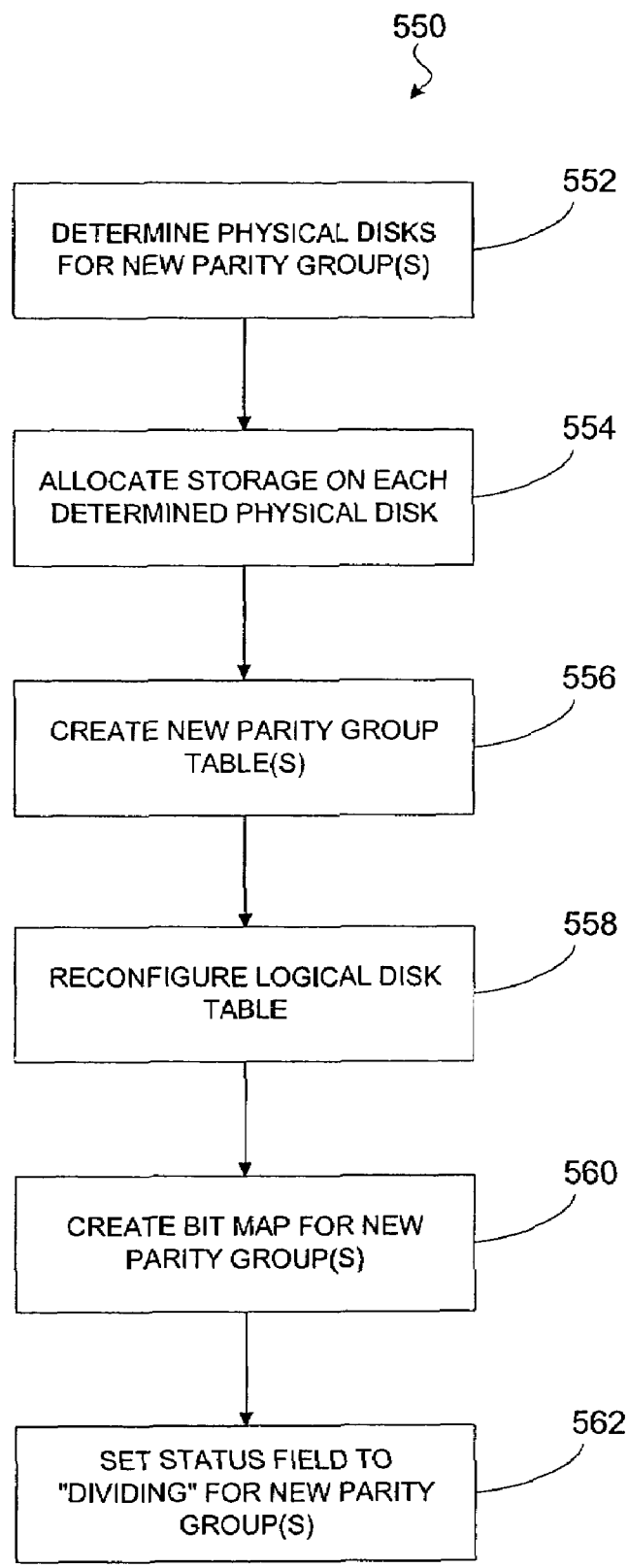
FIG. 9 is a simplified flow diagram illustrating a method of partitioning parity groups according to one embodiment of the present invention.

FIG. 9 is a simplified flow diagram illustrating one embodiment of a method for partitioning a parity group according to the invention. This method may be implemented upon, for example, a system administrator determining that a parity group should be partitioned. For instance, the administrator may determine that a particular parity group is accessed an inordinate number of times compared with other parity groups. Thus, the operator may decide that this highly accessed parity group should be partitioned among a larger number of physical disks in order to increase I/O efficiency. The flow of FIG. 9 will be described with respect to FIGS. 3B, 5B, 8A, 8B, 10 and 11.

FIG. 10 illustrates an example of a data structure that may be used in embodiments according to the present invention. Particularly, FIG. 10 illustrates a table 490 that includes information that can be used for determining whether to partition a parity group. Table 490 is an I/O count table that includes the number of I/O accesses made to each of the parity groups that comprise a logical disk. In the example illustrated in FIG. 10, a logical disk comprises parity groups PG01, PG02 and PG03. As can be seen in table 490, parity group PG01 is accessed an inordinate number of times compared with parity groups PG02 and PG03. Thus, a system administrator may, upon reviewing table 490, determine that parity group PG01 should be partitioned into two or more new parity groups. If so, then the administrator would invoke a method, such as that illustrated in FIG. 9, to partition the parity group.

Referring again to FIG. 9, in a step 552, physical disks to which to copy partitioned parity group data is determined. In some embodiments, a system administrator may provide the physical disks to which the partitioned parity group should be copied. In other embodiments, the physical disks may be determined by, for example, determining which physical disks in the storage system have available storage. In the example illustrated in FIG. 8A, the determined physical disks are PD23, PD24, PD25 and PD26.

Next, in a step 554, storage is allocated for the partitioned parity group on each of the physical disks determined in step 552. Allocation of storage can be accomplished in any number of ways known to those skilled in the art. In the example illustrated in FIG. 8A, storage is allocated on each of the physical disks are PD23, PD24, PD25 and PD26 between the addresses 800 and 900.

Then, in a step 556, new parity group tables are created for the parity group to be partitioned. In the example illustrated in FIG. 8B, parity group PG01 is to be partitioned. Thus, new parity group tables 440 and 460 have been created. It is to be understood that one of the new tables can be created by modifying the table corresponding to the un-partitioned parity group. For example, the table 440 in FIG. 8B can be created by merely modifying table 420.

In a step 558, the logical disk table is modified to reflect the partitioned parity group. FIGS. 3B and 5B illustrate an example of a modification of a logical disk table as in step 558. Particularly, FIG. 3B illustrates a logical disk table 320 prior to modification. FIG. 5B illustrates the logical disk table 320 after modification.

In a step 560, a bit map table is created for new parity groups that will be copied to new physical disks. FIG. 11 illustrates one example of a bit map table 540 that can be used in embodiments of the present invention. Table 540 includes an indication of the parity group that is to be copied. Table 540 also includes a column for each of a plurality of blocks that comprise the parity group. Additionally, for each parity group block, the table 540 includes an indication of whether that block of data has been copied. For example, table 540 indicates that parity group numbers 1, 5, 6 and 8 have been copied to the new physical disks, whereas parity group block numbers 2–4 and 7 have not yet been copied.

In a step 562, the STATUS field in the parity group tables of those new parity groups that will be copied to new physical disks is set to DIVIDING. As can be seen in table 460 of FIG. 8B, status field 470 has been set to DIVIDING.

Automated Partitioning

Figure 12:
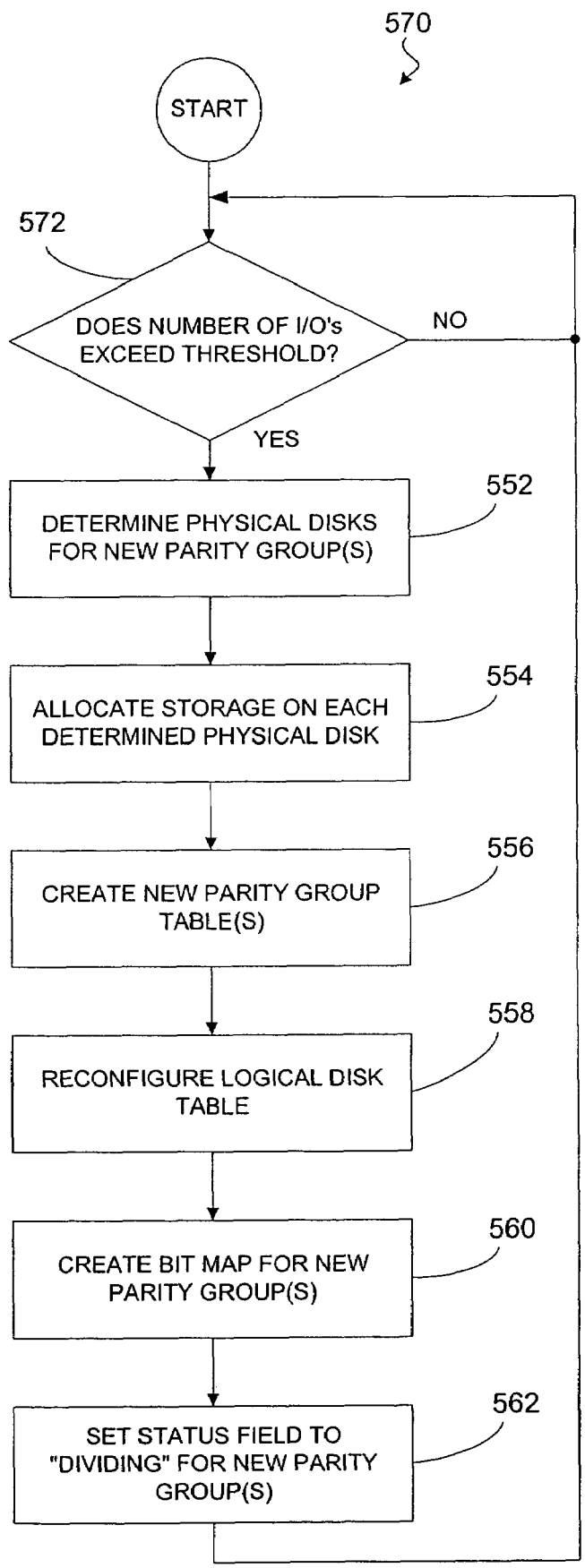
FIG. 12 is a simplified flow diagram illustrating a method of partitioning parity groups according to another embodiment of the present invention.

FIG. 12 is a simplified flow diagram illustrating another embodiment of a method for partitioning a parity group according to the invention. This method is similar to the method described with respect to FIG. 9. However, it includes a step for automatically determining whether a parity group should be partitioned. In this particular embodiment, it is determined, in a step 572, whether the number of I/O accesses for any parity group has exceeded some predetermined threshold. For example, a data structure such as, for example, table 490 of FIG. 10 is monitored. If the number of I/O accesses for a parity group goes above the threshold, then the flow described with respect to FIG. 9 is implemented.

Copying Parity Groups

Figure 13:
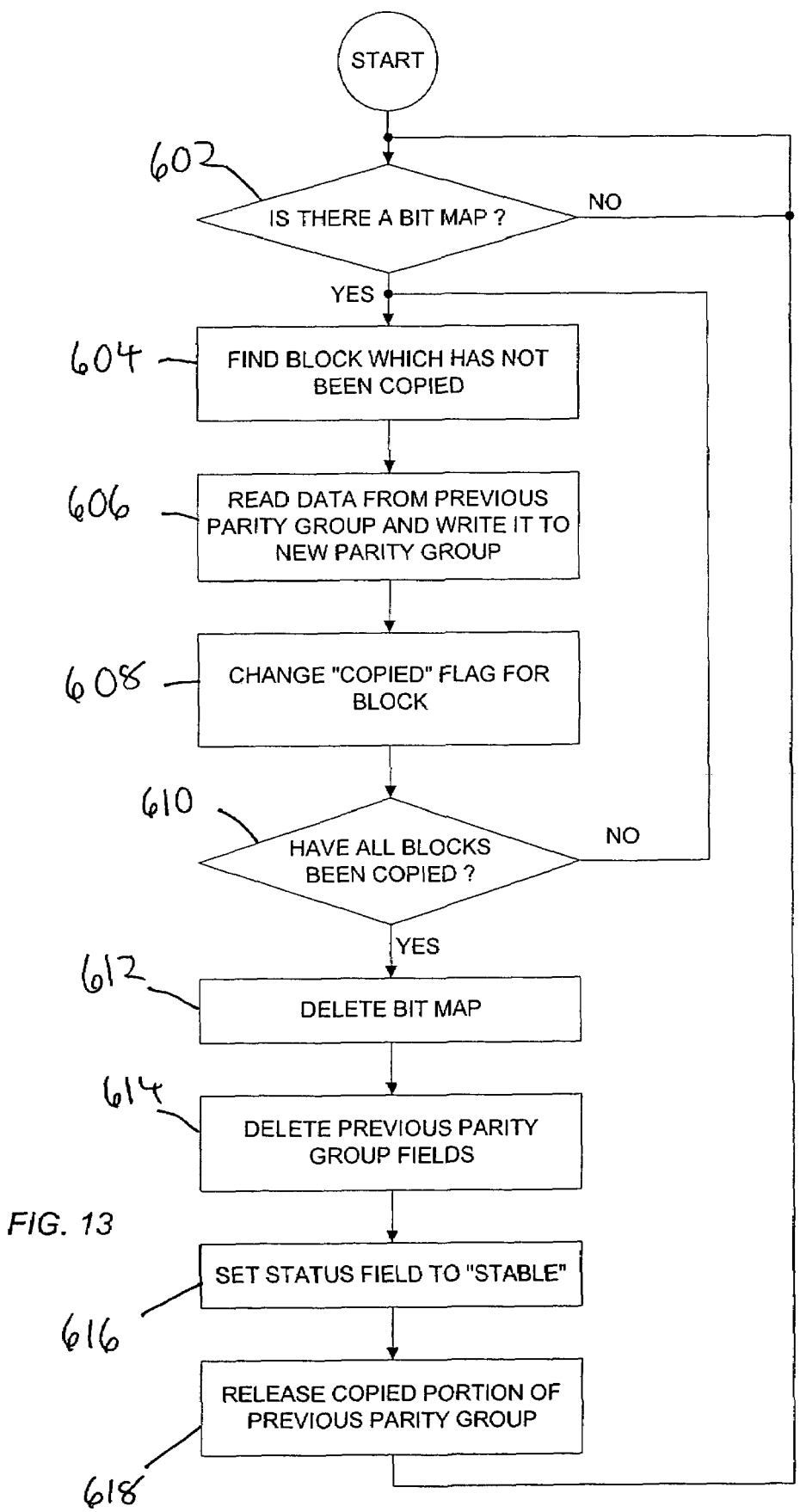
FIG. 13 is a simplified flow diagram illustrating a method of copying parity groups according to one embodiment of the present invention.

FIG. 13 is a simplified flow diagram illustrating one embodiment of a method for copying a parity group according to the present invention. The flow of FIG. 13 will be described with reference to FIG. 11. First, in a step 602, it is determined whether there are any parity groups that need to be copied. In this particular embodiment, a parity group needs to be copied if a bitmap table (such as, for example, table 540 in FIG. 11) exists for that parity group. If no parity groups need to be copied, then the flow does not continue. However, if a parity group does need to be copied, then the flow proceeds to step 604.

In step 604, a parity group block that has not yet been copied is selected. Referring to FIG. 11, parity group blocks 1, 5, 6 and 8 have not yet been copied. Thus, one of these is selected in step 604. Any number of techniques can be used for selecting a parity group block for copying. For example, parity group blocks can be selected in order of their parity group block numbers, randomly selected, etc.

After a parity group block has been selected for copying, data corresponding to the selected block is copied from the old physical disks to the new physical disks in a step 606. Upon completing the copying of the parity group block, the flag in the bitmap table corresponding to the copied block is set, in a step 608, to indicate that the block has been copied.

Next, in a step 610, it is determined whether all of the parity group blocks have been copied. If no, the flow proceeds to step 604 to select the next block to be copied. If yes, the flow proceeds to step 612. In step 612, it is indicated that the parity group no longer needs to be copied. In this particular embodiment, the existence of a bitmap table indicates that a parity group block needs to be copied. Thus, in step 612, the bitmap table is deleted.

Then, in a step 614, data in the parity group table, corresponding to the copied parity group, that indicates from where the parity group was copied is deleted. Referring now to FIG. 8B, the list 472 of physical disks and the indication 474 of the particular segments of the physical disks on which the parity group PG01-2 was previously stored can be deleted from the table 460. Next, in a step 616, the status field in the parity group table is set to indicate that the parity group is no longer being copied. For example, the status field 470 of table 460 can be set to STABLE to indicate that parity group PG01-2 is no longer being copied. Finally, in a step 618 the storage segments on the physical disks from which the parity group was copied are released.

Accessing Data

Figure 14:
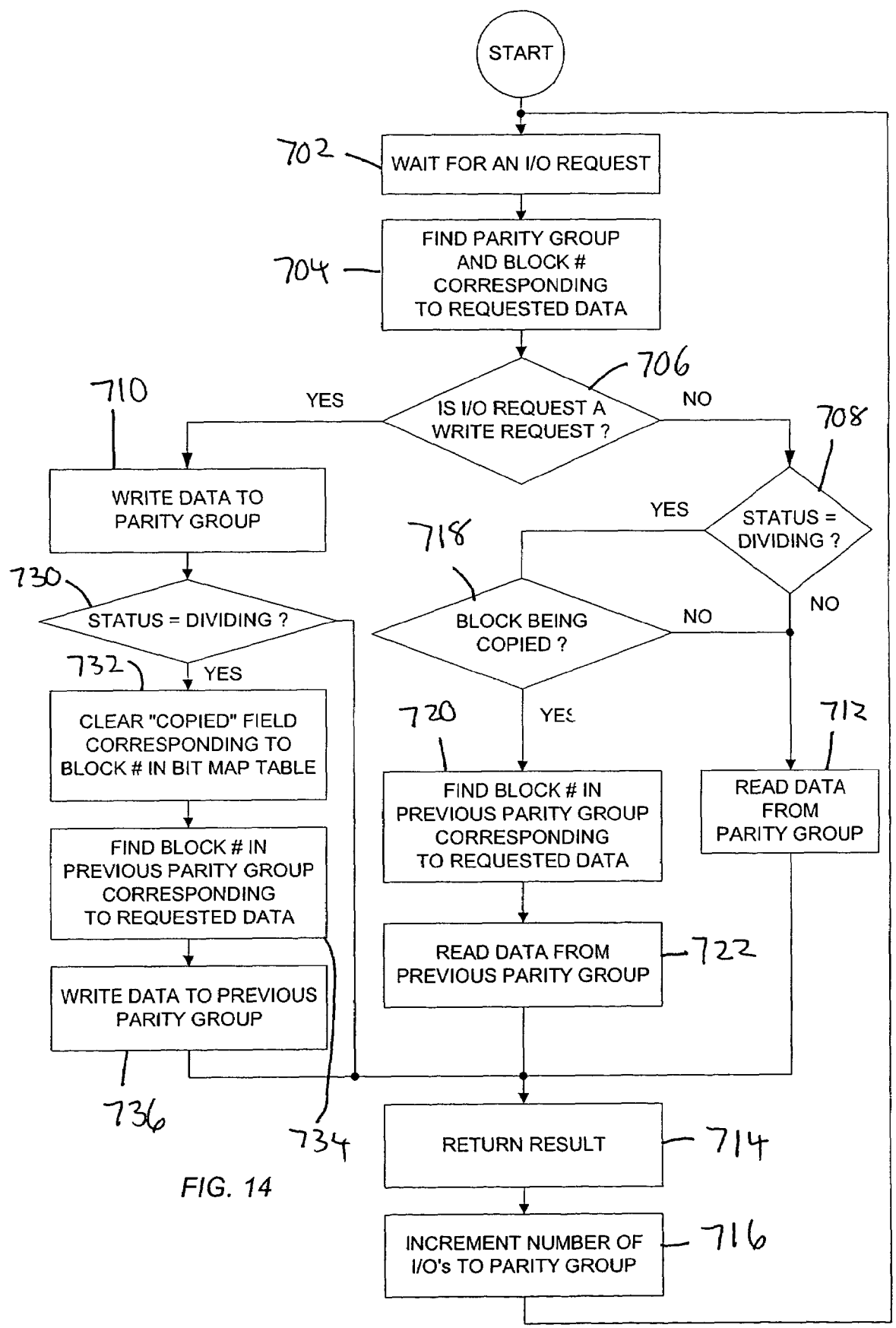
FIG. 14 is a simplified flow diagram illustrating a method of processing I/O accesses according to one embodiment of the present invention.

FIG. 14 is a simplified flow diagram illustrating one embodiment of a method for accessing data from a storage system configured as described above. FIG. 14 will be described with reference to FIGS. 8B and 11. In a step 702, the storage system waits for an I/O request. In embodiments of the present invention, a read request and a write request includes an address in the logical disk space for the data to be accessed. Additionally, a write request includes the data to be written. Upon receiving a request, in a step 704, it is determined to which parity group and to which parity group block number the request corresponds.

Next, in a step 706, it is determined whether the request is a read request or a write request. If the request is a read request, the flow proceeds to step 708. But if the request is a write request, then the flow proceeds to step 710. In step 708, it is determined whether the parity group is in the process of being copied. In embodiments employing a parity group table such as tables 420, 440, and 460 of FIG. 8B, it can be determined whether a parity group is currently being copied by examining the status field of the table. Thus, in FIG. 8B, parity group PG01-1 is not being copied, whereas parity group PG01-2 is being copied.

If the parity group is not being copied, then the flow proceeds to step 712. In step 712, the requested data is read from the parity group and parity group block number determined in step 704. Next, in step 714, the result of the request is returned. For example, with a read request, the data obtained in step 712 is returned. Optionally, in a step 716, a count of I/O requests corresponding to the parity group determined in step 704 is incremented. In some embodiments, a count in a data structure such as, for example, table 490 illustrated in FIG. 10, can be incremented. Finally, the flow proceeds back to step 702 to wait for another I/O request.

If, in step 708, it is determined that the parity group is currently being copied, then the flow proceeds to a step 718. In step 718, it is determined whether the parity group block (determined in step 704) is currently being copied. In some embodiments, a flag in a data structure such as, for example, the bit map table 540 of FIG. 11 is examined to determine whether the parity group block is currently being copied. If the parity group block is not being copied, then the flow proceeds to step 712. But, if the parity group block is being copied, then the flow proceeds to step 720.

In step 720, a parity group block number in the previous parity group corresponding to the I/O request is determined. In some embodiments, a data structure such as, for example, table 460 of FIG. 8B is examined to determine the parity group block number in the previous parity group. Particularly, the list 472 of physical disks as well as the indication 474 of storage segments on those disks can be used to determine the parity group block number. Next, in a step 722, the requested data is read from the previous parity group and the flow proceeds to step 714.

As described above, if, in step 706, it is determined that the request was a write request, then the flow proceeds to step 710. In step 710, the data is written to the parity group block determine in step 704. Then, in step 730, it is determined whether the parity group corresponding to the write request is currently being copied. If the parity group is not being copied, then the flow proceeds to step 714. But, if the parity group is being copied, then the flow proceeds to step 732.

In step 732, it is indicated that the parity group block number corresponding to the write request is not being copied. In some embodiments, a flag, corresponding to the parity group block number, in a data structure such as, for example, the bit map table 540 of FIG. 11 is set to indicate that the parity group block is no longer being copied. Optionally, in a steps 734 and 736, a parity group block number in the previous parity group corresponding to the write request is determined, and the data is written to the parity group block number in the previous parity group as well. Writing data to the previous parity group increases reliability and fault tolerance. For example, if one or more of the physical disk(s) in the new parity group fail, and the data written in step 710 is lost, then that same data, written in step 736, can be recovered from the previous parity group. Finally, the flow proceeds to step 714.

More Reliable Partitioning

In the embodiments described above, a parity group is partitioned into a plurality of new parity groups, and then all but one of the new parity groups are copied to physical disks different than the physical disks on which the previous parity group was stored. However, in some embodiments, all of the new parity groups may stored on different physical disks. This helps to increase reliability of the storage system, because if data in the new parity groups is lost for some reason (e.g., physical disk failure, operator error, etc.) the old parity group can be restored.

Figure 15A:
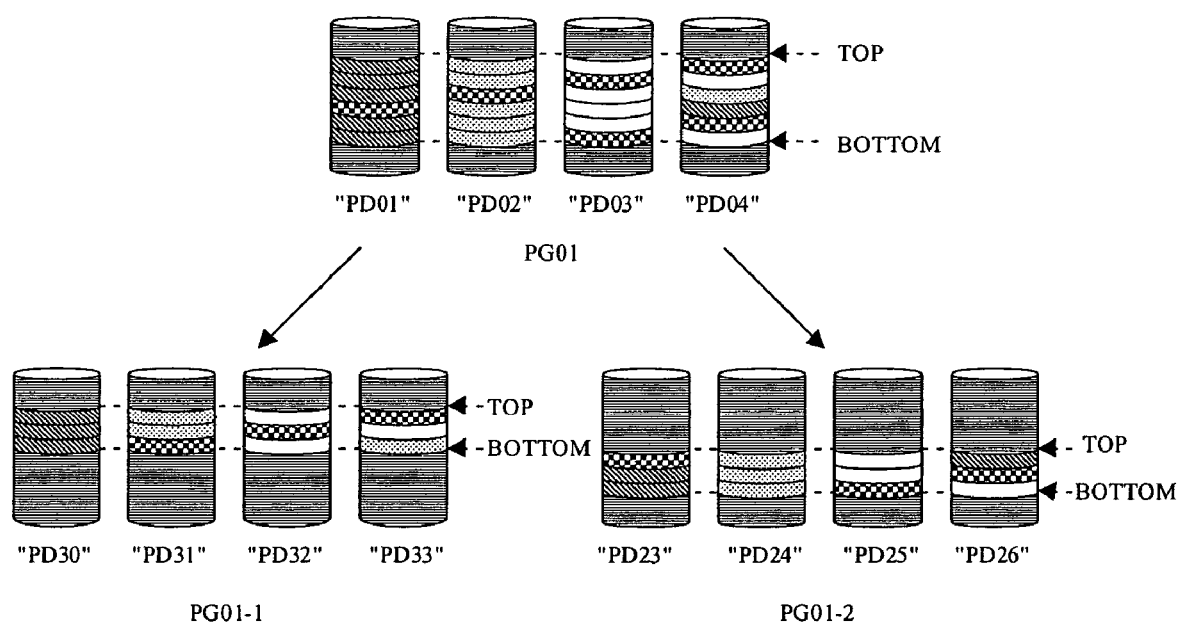
FIG. 15A is a simplified block diagram illustrating partitioning of a parity group according to another embodiment of the present invention.
Figure 15B:
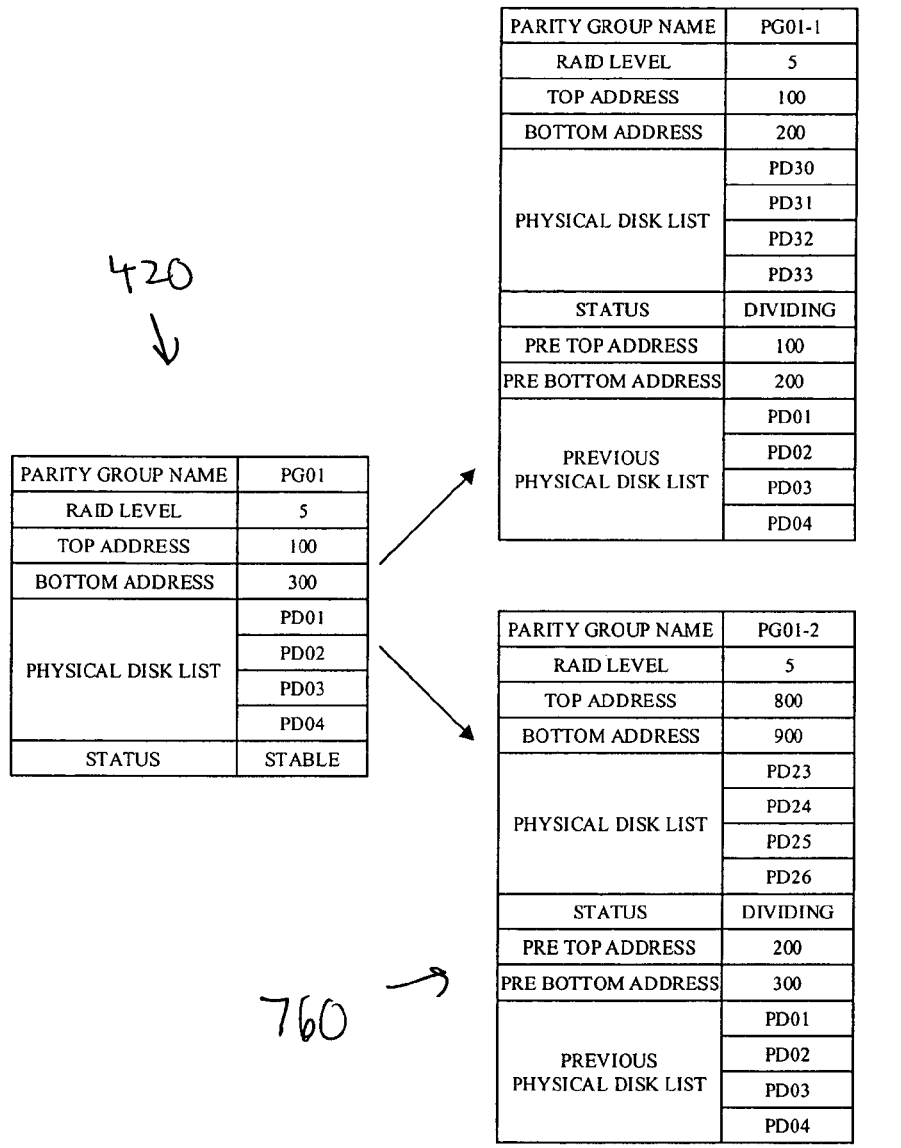
FIG. 15B is an example of a data structure that describes configuration of a partitioned parity group according to another embodiment of the present invention.

FIGS. 15A and 15B illustrate an example of partitioning a parity group into new parity groups, and copying all the new parity groups to a different set of physical disks. Particularly, FIG. 15A illustrates partitioning the parity group PG01 illustrated in FIG. 4A into two new parity groups, PG01-1 and PG01-2. As described above, the parity group PG01 of FIG. 4A comprises storage segments on four physical disks PD01, PD02, PD03 and PD04, according to a RAID5 data allocation. As illustrated in FIG. 15A, the storage segments corresponding to the parity group PG01 are partitioned in two. One half of the parity group is copied from physical disks PD01, PD02, PD03 and PD04 to different physical disks PD30, PD31, PD32 and PD33, and the other half of the parity group is copied from physical disks PD01, PD02, PD03 and PD04 to different physical disks PD23, PD24, PD25 and PD26. FIG. 15B is an example of data structures 740 and 760 that describe the configuration illustrated in FIG. 8A. Table 420 is the table of FIG. 4B and describes the configuration of the parity group PG01 prior to its partitioning. Tables 740 and 760 describe the configuration of the new parity groups PG01-1 and PG01-2, respectively.

In these embodiments, the parity group can be partitioned and copied using methods similar to those described with respect to FIGS. 9, 12 and 13, and data can be accessed using a method similar to that described with respect to FIG. 14. The previous parity group table 420 can be kept so that the previous configuration can be restored if desired.

Storage System

Figure 16:
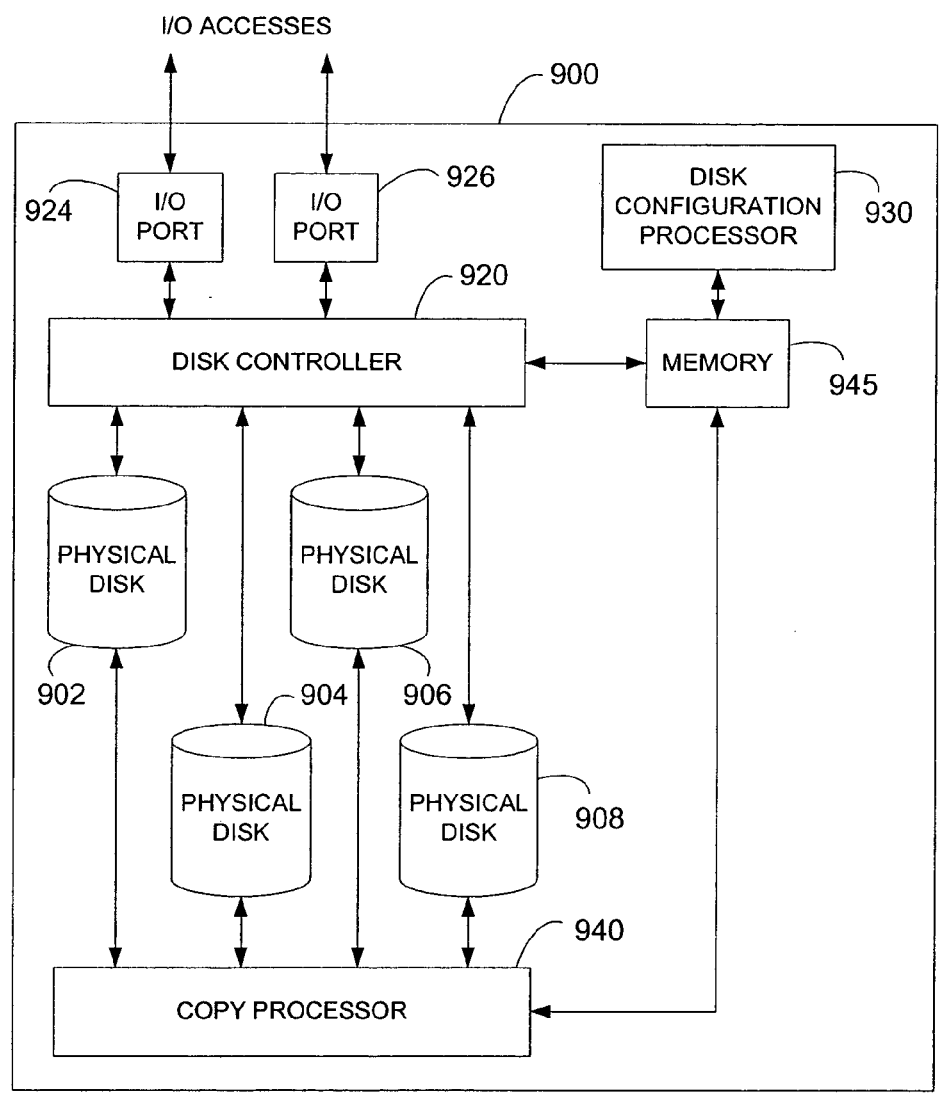
FIG. 16 is a simplified block diagram illustrating a storage system according to one embodiment of the present invention.

FIG. 16 is a simplified block diagram illustrating one embodiment of a storage system 900 according to the present invention. Storage system 900 includes a plurality of physical disks 902, 904, 906, and 908, and a disk controller 920 coupled to the physical disks. The disk controller 920 is further coupled to one or more I/O ports 924 and 926. Storage system 900 also includes a configuration processor 930, and a copy processor 940 coupled to the physical disks. The disk controller 920, the configuration processor 930 and the copy processor 940 and are all coupled to a memory 945.

Disk controller 920 processes I/O requests and, in some embodiments, implements the flow described with respect to FIG. 14. Configuration processor 930 implements the flow described with respect to FIGS. 9 and 12. Copy processor 940 implements the flow described with respect to FIG. 13. Memory 945 implements storage of data structures such as, for example, the data structures described with respect to FIGS. 4B, 7B, 8B, 10, 11 and 15B. Disk controller 920, configuration processor 930 and copy processor 940 can operate independently and in parallel. Thus, partitioning and copying of parity groups can occur concurrently and transparently with I/O accesses to the storage system 900.

It is to be understood that the various functional blocks in the storage system 900 may be implemented by a combination of hardware and/or software, and that in specific implementations some or all of the functionality of some of the blocks may be combined. For example, disk controller 920, configuration processor 930 and copy processor 940 need not be separate processors. Rather, two or more of disk controller 920, configuration processor 930 and copy processor 940 can be combined in a single processor.

The invention has now been explained with reference to specific embodiments. Other embodiments will be apparent to those of ordinary skill in the art. Therefore it is not intended that this invention be limited except as indicated by the appended claims.

What is claimed is:

1. A method comprising:
Providing a logical disk configured as a plurality of logical entities, each of the logical entities being configured as a plurality of physical disks;
Copying at least some portion of data on a first logical entity to at least one physical disk not included in the plurality of logical entities;
Determining a relatively highly accessed one of the plurality of logical entities; and
Selecting that relatively highly accessed one of the plurality of logical entities for the step of copying.

2. The method of claim 1 wherein the plurality of physical disks is the same as the number of the at least one physical disk not included in the plurality of logical entities.

3. A method as in claim 1 wherein the logical entities comprise parity groups.

4. A method as in claim 1 wherein:
the plurality of logical entities include a parity group which is partitioned into two parity groups, each of the logical entities being configured as a plurality of physical disks;
the at least one physical disk not included in the plurality of logical entities includes a set of physical disks; and
one of the two parity groups is copied to the set of physical disks.

5. A method comprising:
providing a logical disk configured as a plurality of logical entities, each of the logical entities being implemented as a plurality of physical disks; and
dividing at least one logical entity into a plurality of first logical entities, each of the plurality of first logical entities being implemented by a different set of physical disks;
determining a relatively highly accessed one of the plurality of logical entities; and
selecting that relatively highly accessed one of the plurality of logical entities for the step of dividing.

6. The method of claim 5, wherein the at least one logical entity comprises a relatively highly accessed one of the logical entities.

7. The method of claim 5 wherein the number of the plurality of physical disks is the same as the number of physical disks in the different set of physical disks.

8. A storage system comprising:
A plurality of physical disks; and
A controller coupled to the physical disks, the controller configured to:
Providing a logical disk configured as a plurality of logical entities, each of the logical entities being implemented with a subset of the plurality of physical disks;
Copy at least some portion of data on one of the logical entities to at least one physical disk not included in the subset of the plurality of physical disks;
Determine a relatively highly accessed one of the plurality of logical entities; and Select that relatively highly accessed one of the plurality of logical entities for the step of copying.

9. A storage system as in claim 8 wherein the controller is further configured to divide at least one of the plurality of logical entities into at least two logical entities, each one of the at least two logical entities being implemented by a different subset of the plurality of physical disks.

10. A method comprising:
Providing a logical disk configured as a plurality of logical entities, each of the logical entities being configured as a plurality of physical disks;
Copying at least some portion of data on a first logical entity to at least one physical disk not included in the plurality of logical entities; and wherein
The plurality of logical entities include a parity group which is partitioned into two parity groups, each of the logical entities being configured as a plurality of physical disks, the at least one physical disk not included in the plurality of logical entities includes a set of physical disks, and one of the two parity groups is copied to the set of physical disks.

11. The method of claim 10 further comprising before the step of copying, steps of:
Determine a relatively highly accessed one of the plurality of logical entities; and
Select that relatively highly accessed one of the plurality of logical entities for the step of copying.

12. The method of claim 10 wherein the plurality of physical disks is the same as the number of the at least one physical disk not included in the plurality of logical entities.

13. The method as in claim 11 wherein the logical entities comprise parity groups.

14. A storage system comprising:

A plurality of physical disks; and

A controller to the physical disks, the controller configured to:

Provide a logical disk configured as a plurality of logical entities, each of the logical entities being implemented with a subset of the plurality of physical disks;

Copy at least some portion of data on one of the logical entities to at least one physical disk not included in the subset of the plurality of physical disks;

Determine a relatively highly accessed one of the plurality of logical entities;

Select that relatively highly accessed one of the plurality of logical entities for the step of copying;

Wherein the plurality of logical entities include a parity group which is partitioned into two parity groups, each of the logical entities being configured as a plurality of physical disks, the at least one physical disk not included in the plurality of logical entities includes a set of physical disks, and one of the two parity groups is copied to set of physical disks.

15. The storage system as in claim 14 wherein the controller is further configured to divide at least one of the plurality of logical entities into at least two logical entities, each one of the at least two logical entities being implemented by a different subset of the plurality of physical disks.

* * * * *